United States Patent
Chopra et al.

(10) Patent No.: US 10,635,334 B1
(45) Date of Patent: Apr. 28, 2020

(54) RULE BASED DATA TRANSFER MODEL TO CLOUD

(71) Applicant: EMC IP Holding Company LLC, Hopkinton, MA (US)

(72) Inventors: Shelesh Chopra, Bangalore (IN); Gururaj Kulkarni, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 140 days.

(21) Appl. No.: 15/718,373

(22) Filed: Sep. 28, 2017

(51) Int. Cl.
*G06F 12/00* (2006.01)
*G06F 3/06* (2006.01)

(52) U.S. Cl.
CPC .......... *G06F 3/0629* (2013.01); *G06F 3/0604* (2013.01); *G06F 3/0656* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 5,493,689 A | 2/1996 | Waclawsky et al. | |
| 5,606,693 A | 2/1997 | Nilsen et al. | |
| 5,668,986 A | 9/1997 | Nilsen et al. | |
| 6,298,451 B1 | 10/2001 | Lin | |
| 6,421,317 B1 | 7/2002 | Denecheau et al. | |
| 6,665,812 B1 | 12/2003 | Blumenau et al. | |
| 6,826,711 B2 | 11/2004 | Moulton et al. | |
| 7,246,207 B2 * | 7/2007 | Kottomtharayil | G06F 3/0617 711/154 |
| 7,263,529 B2 | 8/2007 | Cordery et al. | |
| 7,302,450 B2 | 11/2007 | Benedetti et al. | |
| 7,315,923 B2 * | 1/2008 | Retnamma | G06F 11/1464 711/161 |
| 7,343,453 B2 * | 3/2008 | Prahlad | G06F 3/0605 711/117 |
| 7,346,686 B2 | 3/2008 | Albert et al. | |
| 7,664,847 B2 | 2/2010 | Colrain et al. | |
| 7,954,143 B2 | 5/2011 | Aaron | |
| 8,156,086 B2 * | 4/2012 | Lu | G06F 11/1448 707/690 |
| 8,156,502 B1 | 4/2012 | Blanding | |

(Continued)

FOREIGN PATENT DOCUMENTS

EP 2677721 A1 12/2013

OTHER PUBLICATIONS

"Defenders of the Virtual World"; EMC Corporation, EMC Backup, Recovery & Archive Solutions, Backup Recovery Systems Division; Jun. 7, 2012 (59 pages).

(Continued)

*Primary Examiner* — John A Lane
(74) *Attorney, Agent, or Firm* — Chamberlain, Hrdlicka, White, Williams & Aughtry

(57) ABSTRACT

A data management device includes a persistent storage and a processor. The persistent storage includes client data. The processor obtains a data storage trend that specifies a rate of storing the client data in the persistent storage over a predetermined period of time; matches the persistent storage trend to a rule based on the data storage trend; and applies the matched rule to a manager of the persistent storage.

19 Claims, 11 Drawing Sheets

(56) References Cited

U.S. PATENT DOCUMENTS

| | | | |
|---|---|---|---|
| 8,209,696 B2 | 6/2012 | Ferguson et al. | |
| 8,286,174 B1 | 10/2012 | Schmidt et al. | |
| 8,375,396 B2 | 2/2013 | Pooni et al. | |
| 8,387,054 B1 | 2/2013 | Zeis et al. | |
| 8,412,900 B1 * | 4/2013 | Sano | G06F 11/1443 710/29 |
| 8,458,210 B2 | 6/2013 | Arifuddin et al. | |
| 8,549,247 B2 * | 10/2013 | Satoyama | G06F 3/0608 711/114 |
| 8,578,120 B2 * | 11/2013 | Attarde | G06F 11/1453 711/170 |
| 8,695,012 B2 | 4/2014 | Kanso et al. | |
| 8,782,256 B2 | 7/2014 | Dec et al. | |
| 8,965,921 B2 | 2/2015 | Gajic | |
| 8,972,326 B2 | 3/2015 | Prathaban et al. | |
| 9,069,482 B1 | 6/2015 | Chopra | |
| 9,141,435 B2 | 9/2015 | Wein | |
| 9,172,750 B2 | 10/2015 | Bulkowski et al. | |
| 9,372,637 B1 | 6/2016 | Alatorre et al. | |
| 9,489,270 B2 | 11/2016 | Anglin et al. | |
| 9,519,432 B1 | 12/2016 | Haustein et al. | |
| 9,672,116 B1 | 6/2017 | Chopra et al. | |
| 9,838,332 B1 | 12/2017 | Smith | |
| 10,013,189 B1 | 7/2018 | Yang | |
| 10,250,488 B2 | 4/2019 | Cropper | |
| 10,423,459 B1 | 9/2019 | Jacques de Kadt et al. | |
| 2001/0054095 A1 | 12/2001 | Kampe et al. | |
| 2003/0224781 A1 | 12/2003 | Milford et al. | |
| 2004/0153708 A1 | 8/2004 | Joshi et al. | |
| 2004/0186844 A1 | 9/2004 | Muhlestein | |
| 2005/0010727 A1 | 1/2005 | Cuomo et al. | |
| 2005/0033818 A1 | 2/2005 | Jardin | |
| 2005/0149940 A1 | 7/2005 | Calinescu et al. | |
| 2007/0180314 A1 | 8/2007 | Kawashima et al. | |
| 2007/0198797 A1 | 8/2007 | Kavuri | |
| 2007/0220319 A1 | 9/2007 | Desai et al. | |
| 2008/0115190 A1 | 5/2008 | Aaron | |
| 2008/0222297 A1 | 9/2008 | Mengerink | |
| 2009/0144388 A1 | 6/2009 | Gross et al. | |
| 2009/0164832 A1 | 6/2009 | Kanso et al. | |
| 2010/0017445 A1 | 1/2010 | Kobayashi | |
| 2011/0022812 A1 | 1/2011 | can der Linden et al. | |
| 2011/0153941 A1 | 6/2011 | Spatscheck et al. | |
| 2011/0178831 A1 | 7/2011 | Ravichandran | |
| 2012/0059934 A1 | 3/2012 | Rafiq et al. | |
| 2012/0117028 A1 | 5/2012 | Gold et al. | |
| 2012/0204187 A1 | 8/2012 | Breiter et al. | |
| 2014/0025796 A1 | 1/2014 | Vibhor et al. | |
| 2014/0089511 A1 | 3/2014 | McLean | |
| 2014/0211698 A1 | 7/2014 | Aguirre et al. | |
| 2014/0297611 A1 | 10/2014 | Abbour et al. | |
| 2014/0304412 A1 | 10/2014 | Prakash et al. | |
| 2014/0331078 A1 | 11/2014 | Cohen | |
| 2014/0337285 A1 * | 11/2014 | Gokhale | G06F 11/1464 707/610 |
| 2015/0067353 A1 | 3/2015 | Hui | |
| 2015/0067354 A1 | 3/2015 | Hui | |
| 2015/0286519 A1 | 10/2015 | Huang et al. | |
| 2016/0092311 A1 | 3/2016 | Bushman | |
| 2017/0371562 A1 * | 12/2017 | Delaney | G06F 3/0647 |

OTHER PUBLICATIONS

"EMC® NetWorker® Module for Microsoft for Exchange Server VSS, Release 8.2, User Guide"; EMC Corporation; 2014 (150 pages).

Extended European Search Report issued in corresponding European Application No. 19169660.8, dated Aug. 30, 2019.

Slota et al.; "Prediction and Load Balancing System for Distributed Storage"; Scalable Computing: Practice and Experience (SCPE); vol. 11, No. 2; pp. 121-130; 2010.

* cited by examiner

RULE BASED DATA TRANSFER MODEL TO CLOUD

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, a data management device in accordance with one or more embodiments of the invention includes a persistent storage and a processor. The persistent storage includes client data. The processor obtains a data storage trend that specifies a rate of storing the client data in the persistent storage over a predetermined period of time; matches the persistent storage trend to a rule based on the data storage trend; and applies the matched rule to a manager of the persistent storage.

In one aspect, a method of operating a data management device in accordance with one or more embodiments of the invention includes obtaining, by the data management device, a data storage trend that specifies a rate of storing client data in a persistent storage over a predetermined period of time. The method further includes matching, by the data management device, the persistent storage trend to a rule based on the data storage trend. The method further includes applying, by the data management device, the matched rule to a manager of the persistent storage that manages the persistent storage.

In one aspect, a non-transitory computer readable medium in accordance with one or more embodiments of the invention includes computer readable program code, which when executed by a computer processor enables the computer processor to perform a method for operating a data management device, the method includes obtaining, by the data management device, a data storage trend that specifies a rate of storing client data in a persistent storage over a predetermined period of time. The method further includes matching, by the data management device, the persistent storage trend to a rule based on the data storage trend. The method further includes applying, by the data management device, the matched rule to a manager of the persistent storage that manages the persistent storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
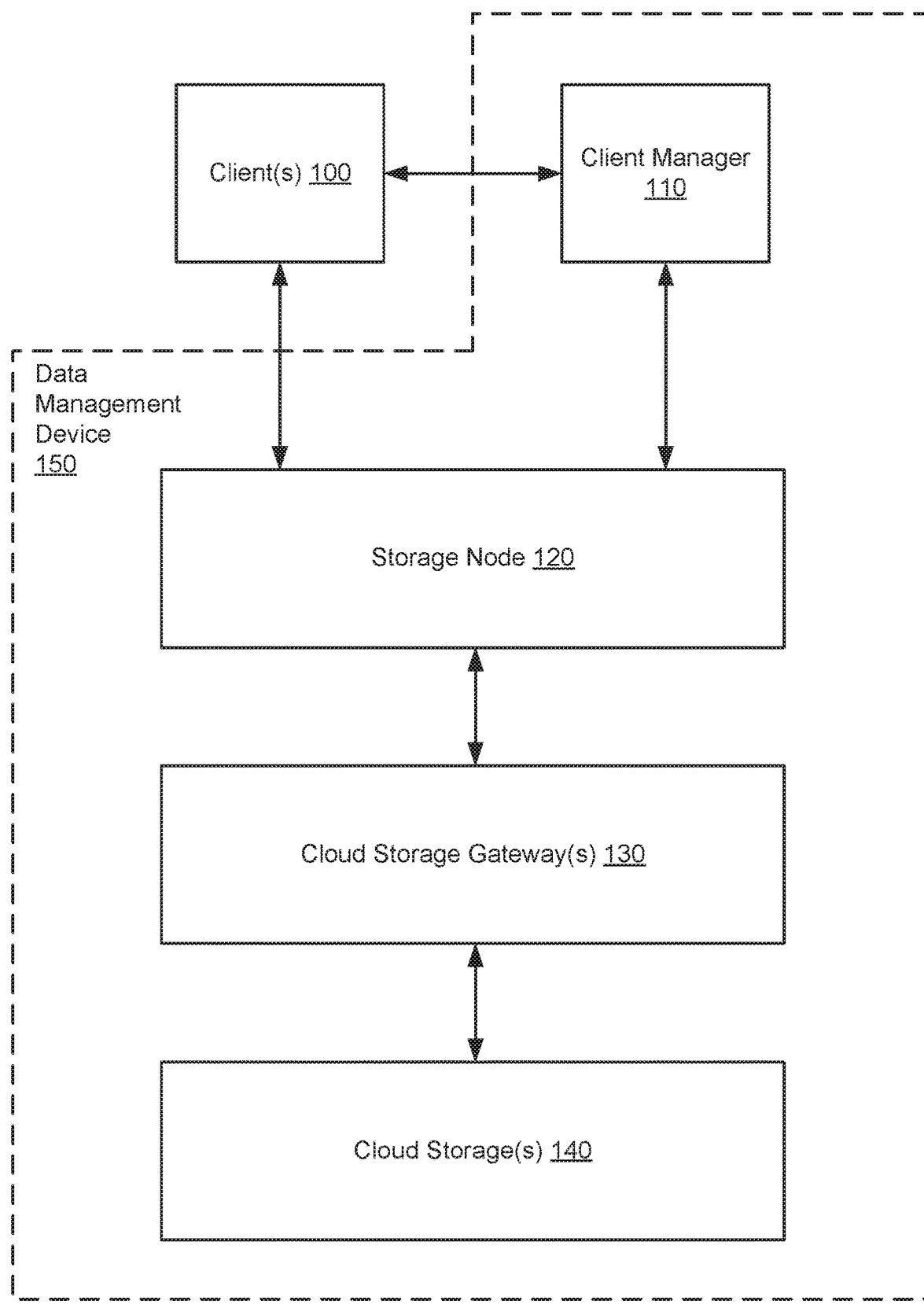
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. More specifically, the systems, devices, and methods may modify the allocation of computing resources of a data management device for storage of client data on a per client basis. The computing resources may be allocated based on changes in the rate of client data being stored in the data management device over time, or other metrics. For example, additional computing resources may be allocated for storage of a first client's data if the rate of storage of the first client's data has increased when compared to the rate of storage of the first client's data during a prior period of time. In another example, computing resources allocated for storage of first client's data may be reduced if the rate of storage of the first client's data has decreased when compared to the rate of storage of the first client's data during a prior period of time. In another example, the steps for storing the first client's data may be changed if the rate of storage of the first client's data has changed when compared to the rate of storage of the first client's data during a prior period of time.

In one or more embodiments of the invention, the computing resources assigned to store client data and/or the method of storing the client data may be modified dynamically. For example, when the rate of storing each client's data changes, the computing resources assigned to each client may be changed. Changing the computing resources allocated to store each client's data and/or the manner in which the client's data is stored may ensure that each client is provided with a quality of storage service by the data management device. In other words, dynamically changing the computing resources allocated to store each client's data and/or manner in which the client data is stored may reduce the chance of client data being lost and/or ensure that the client data is made available, e.g., exposed, for retrieval within a predetermined amount of time.

As used herein, computing resources refer to processor computing cycles, communication bandwidth, transitory storage input-output cycles, persistent storage input-output cycles, and/or transitory or persistent memory storage capacity. Transitory storage may be provided by, for example, random access memory. Persistent storage memory may be provided by, for example, a solid state hard disk drive. Processor computing cycles may be provided by, for example, a central processing unit. Communication bandwidth may be provided by, for example, a network interface card.

FIG. 1A shows a system in accordance with one or more embodiments of the invention. The system may include client(s) (100) that store data in the data management device (150). The client(s) (100) and data management device (150) may be operably connected to each other. The connection may be, for example, a network connection. Each component of the system is discussed below.

The clients (100) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention.

The clients (100) may be programmed to store data in the data management device (150). More specifically, the clients (100) may send data to the data management device (150) for storage and may request data managed, e.g., stored, by the data management device (150). The data management device (150) may store the data or provide the requested data in response to such requests.

In one or more embodiments of the invention, the clients (100) may utilize the data management device (150) to store a copy of all of the client's data. In other words, the data management device (150) may be used as to back up the client's data. In one or more embodiments of the invention, the clients (100) may utilize the data management device (150) to store data. In other words, rather than storing data to a local storage, the clients (100) may store data the data management device (150) without making a local copy of the stored data. The data management device (150) may be used for other purposes without departing from the invention.

The data management device (150) may be a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and illustrated in at least FIGS. 4A-4D. The data management device (150) may be other types of computing devices without departing from the invention.

In one or more embodiments of the invention, the data management device (150) may be a distributed computing device. As used herein, a distributed computing device refers to functionality provided by a logical device that utilizes the computing resources of one or more separate and/or distinct computing devices. For example, in one or more embodiments of the invention, the data management device (150) may be a distributed device that includes components distributed across a number of separate and/or distinct computing devices. In such a scenario, the functions shown in FIGS. 4A-4D may be executed by different computing devices without departing from the invention.

In one or more embodiments of the invention, the data management device (110) may include a client manager (110) that manages the clients (110), a storage node (120) that receives storage and/or read requests from the clients (110), cloud storage gateway(s) (130) that selects a storage for data received from the clients (100), and cloud storages (140) that store some data received from the clients (100). Each component of the data management device (150) is discussed below.

The client manager (110) may manage the clients (100) by assigning each client to corresponding storage nodes (120). In other words, the client manager (110) may be assigned to direct to which device one or more clients send their requests to store and read client data. The client manager (110) may assign a client to a storage node based on one or more of the following factors: (i) minimization of network communications required to store client data based on the topology of the network, (ii) relatedness of the clients already assigned to a storage node, (iii) ownership of the client, and (iv) number of clients assigned to a storage node. The client manager (110) may assign clients to storage nodes based on additional, fewer, and/or different factors without departing from the invention.

In one or more embodiments of the invention, the client manager (110) may be a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform all or a portion of the functions described in this application and illustrated in at least FIGS. 4A-4D. The client manager (110) may be other types of computing devices without departing from the invention.

The storage node (120) may receive client data storage and/or access requests from the clients (100). In response to these requests, the storage node (120) may direct the cloud storage gateway(s) (130) to store or provide client data specified by the requests. The storage node (120) may direct the cloud storage gateway(s) (130) to store or provide client data specified by the requests based on one or more of the following factors: (i) presence or lack of previously stored client data in a particular cloud storage gateway, (ii) a utilization rate of computing resources of a particular cloud gateway, (iii) a type of data specified by the storage/access request, and (iv) an owner of the client that issued the data storage/access request. The storage node (120) may direct the cloud storage gateway(s) (130) to store or provide client data specified by the requests based on additional, fewer, and/or different factors without departing from the invention.

Additionally, the storage node (120) may monitor data storage trends associated with the client(s) (100). Based on the monitoring, the storage node (120) may modify the computing resources allocated to fulfill the client data storage/access requests and/or the method in which the storage/access are performed. As used herein, modifying the computing resources allocated to fulfill the client data storage/access requests and/or the method in which the storage/access are performed may be referred to as a modification of a transfer characteristic of the data management device. The storage node (120) may modify the computing resources allocated to each of the clients and/or the method in which the storage/access are performed to maintain a quality of storage service to the clients. The quality of storage service may be, for example, a rate at which client data is stored, a maximum period of time before data sent to the data management device (150) for storage is available to be read, and/or a rate at which client data is provided to client(s). In another example, the quality of storage service may be a maximum amount of time before client data stored in the data management device is available to be retrieved. The storage node (120) may modify the aforementioned allocation of computing resources by sending a message to the cloud storage gateway(s) (130) specifying the modifications.

As will be discussed in greater detail below, data stored in the data management device (150) may be deduplicated before storage. Deduplicating data and retrieving deduplicated data both use a larger quantity of computing resources when compared to storing and retrieving data that has not been deduplicated. Proactive management of computing resources may help ensure a quality of storage service by allocating or deallocating the aforementioned resources and/or modifying the method in which the storage/access are performed. If computing resources are not proactively managed, a quality of storage service, for example, may not be able to be maintained.

In one or more embodiments of the invention, the storage node (120) may be a computing device. The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform all or a portion of the functions described in this application and illustrated in at least FIGS. 4A-4D. The storage node (120) may be other types of computing devices without departing from the invention. For additional details regarding the storage node (120), See FIG. 1B.

While the storage node (120) in FIG. 1A is illustrated as being connected to cloud storage gateway(s) (130), the storage node (120) could be connected to other types of devices that store data without departing from the invention. For example, in some embodiments of the invention, the storage node (120) may be connected to a cloud storage (140) rather than a gateway. In other embodiments of the invention, the storage node (120) may be connected to a network attached storage (NAS) (not shown). The storage node (120) may be connected to any other type of data storage device without departing from the invention.

Additionally, in some embodiments of the invention, the storage node (120) may perform specific functions. For example, the storage node (120) may store/retrieve media files such as audio or video recordings stored on a data storage operably connected to the storage node (120). In such embodiments, the storage node (120) may be referred to as a media server.

The cloud gateway(s) (130) may receive client data storage/access requests from the storage node (120). In response to these requests, the cloud gateway(s) (130) may store or retrieve client data specified by the requests. The cloud gateway(s) (130) may include a local storage and may be operably connected to one or more cloud storage(s) (140). The cloud storage gateway(s) (130) may store or provide client data specified by the requests using the local storage or the cloud storage(s) (140) based on one or more of the following factors: (i) presence or lack of the specified data in the respective storage (i.e., local or remote) and (ii) operational settings of the cloud storage gateway (130) set by the storage node (120). The operational settings of the cloud storage gateway (130) may be received from the storage node (120) via a message that specifies changes in allocation of computing resources to one or more of the clients. The cloud gateway(s) (130) may store/access client data specified by the requests using the local storage or the cloud storage(s) (140) based on additional, fewer, and/or different factors without departing from the invention.

In one or more embodiments of the invention, the cloud gateway(s) (130) may be a computing device. The computing device may be, for example, a mobile phone, a tablet computer, a laptop computer, a desktop computer, a server, a distributed computing system, or a cloud resource. As used herein, a cloud resource may be a distributed computing device that utilizes computing resources from a number of separate and/or distinct computing devices. In one or more embodiments of the invention, the cloud resource may be a cloud computing system that includes any number of computing devices that each performs functions of the cloud computing system.

The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform all or a portion of the functions described in this application and illustrated in at least FIGS. 4A-4D. The cloud gateway(s) (130) may be other types of computing devices without departing from the invention. For additional details regarding the cloud gateway(s) (130), See FIG. 1C.

The cloud storage(s) (140) may receive client data storage and access requests from the cloud storage gateway(s) (130). In response to these requests, the cloud storage(s) (140) may store or provide client data specified by the requests.

In one or more embodiments of the invention, the cloud storage(s) (140) may store client data in deduplicated storages. In other words, the cloud storage gateway(s) or the cloud storage(s) (140) may deduplicate the data against data stored in the cloud storage(s) (140) before the client data is stored in the cloud storage(s) (140).

As used herein, a deduplicated storage refers to a storage that attempts to reduce the required amount of storage space to store data by not storing multiple copies of the same files or bit patterns located near the storage location of the data within a storage when a the data is first stored in the storage. A deduplicated storage balances the input-output (IO) limits of the physical devices used to implement the storage stored against the benefit of reduced storage space requirements by only comparing the to-be-stored data to a portion of all of the data stored in the object storage.

To deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated with a portion of the data already stored in the storage. Any segments of the to-be-stored data that do not match a fingerprint of the portion of the data already stored in the storage may be stored in the storage, the other segments are not stored in the storage. A file recipe to generate the now-stored data may be generated and stored so that the now-stored data may be retrieved from the storage. The recipe may include information that enables all of the segments of the to-be-stored data that were stored in the storage and all of the segments of the data already stored in the object storage having fingerprints that matched the fingerprints of the segments of the to-be-stored data to be retrieved from the object storage. For additional details regarding files and file segments, See FIGS. 3A-3B.

As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is 10^-20 or less. In one or more embodiments of the invention, the unavoidable fatal error may be caused by a force of nature such as, for example, a tornado. In other words, the fingerprint of any two segments that specify different data will virtually always be different.

In one or more embodiments of the invention, a fingerprint of a bit sequence is generated by obtaining a hash of the bit sequence. The hash may be generated using, for example, secure hashing algorithm (SHA) 1. Other hashing algorithms may be used without departing from the invention.

The process of deduplication of data, discussed above, utilizes computing resources including processing cycles, storage IO, and/or network communications bandwidth. Multiple clients may attempt to store data in the data management device and thereby consume all available computing resources resulting in a reduced quality of storage service. Embodiments of the invention may improve the quality of storage service by proactively assigning computing resources on a per client basis and/or modify the method in which the storage/access are performed to maintain a minimum quality of storage service for each of the clients.

In one or more embodiments of the invention, each of the cloud storage(s) (140) may be a computing device. The computing device may be, for example, a mobile phone, a tablet computer, a laptop computer, a desktop computer, a server, a distributed computing system, or a cloud resource.

The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform all or a portion of the functions described in this application and illustrated in at least FIGS. 4A-4D. The cloud storage(s) (140) may be other types of computing devices without departing from the invention. For additional details regarding the cloud gateway(s) (130), See FIG. 1D.

Figure 1B:
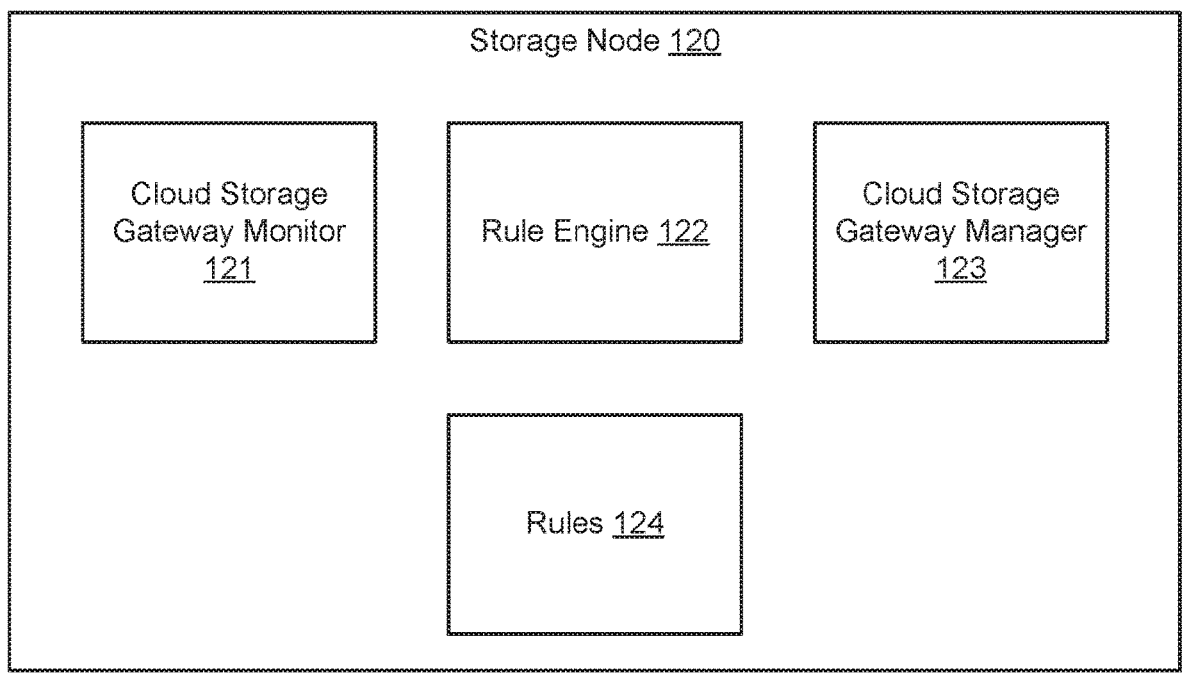
FIG. 1B shows a diagram of a storage node in accordance with one or more embodiments of the invention.
Figure 1C:
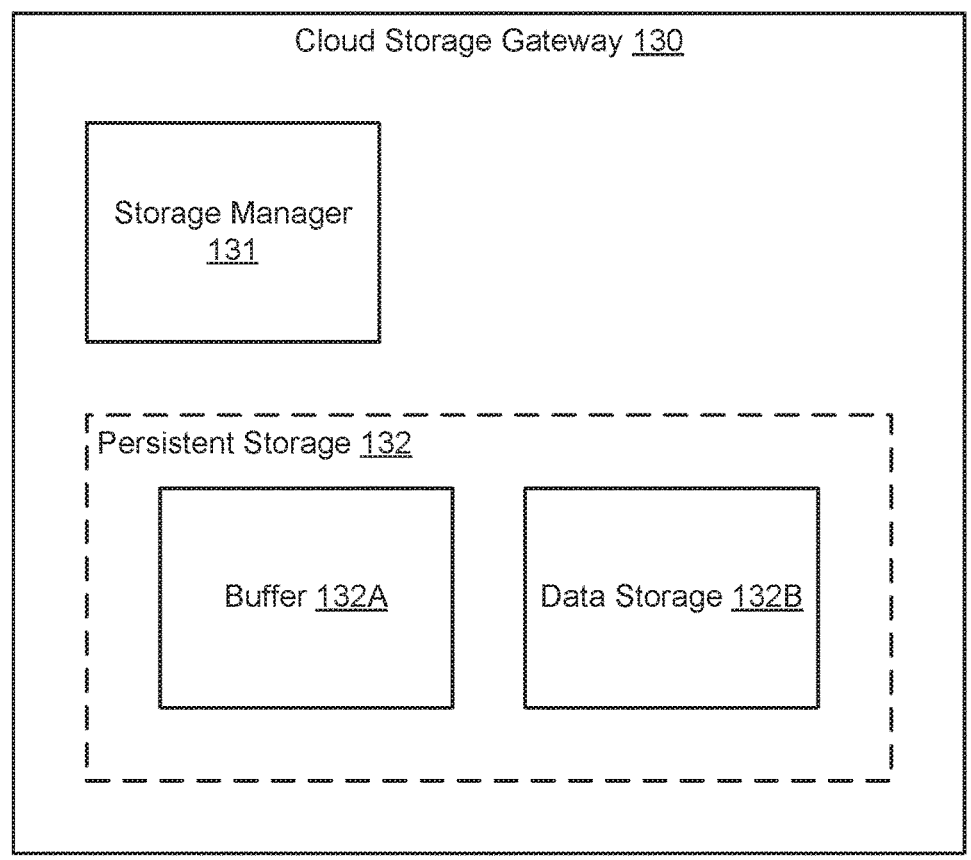
FIG. 1C shows a diagram of a cloud storage gateway in accordance with one or more embodiments of the invention.
Figure 1D:
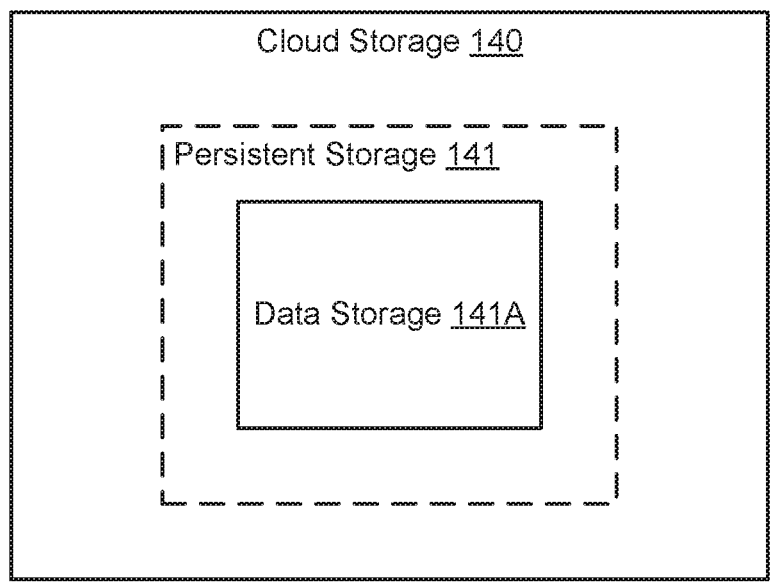
FIG. 1D shows a diagram of a cloud storage in accordance with one or more embodiments of the invention.

To further explain the operation of components of the systems, FIGS. 1B-1D show diagrams of individual components of the system. While these diagrams illustrate portions of the components of the system, each of the components of the system may include additional, fewer, or different portions without departing from the invention.

FIG. 1B shows a diagram of an example storage node (120) in accordance with one or more embodiments of the invention. As discussed above, the storage node may receive client data storage/access requests from the client(s) (100, FIG. 1A) and modify the computing resources allocated to each of the clients for processing of data storage/access requests. To facilitate these functions, the example storage node (120) may include a cloud storage gateway monitor (121) that monitors the storage of client data over time, a rule engine (122) that specifies methods of operating the cloud storage gateway(s) (130, FIG. 1A) based on applying rules (124) to the storage of client data over time monitored by the cloud storage gateway monitor (121), and a cloud storage gateway manager (123) that generates and sends update messages to the cloud storage gateway(s) (130, FIG. 1) in response to the rule engine (122). Each component of the example storage node (120) is discussed below.

The cloud storage gateway monitor (121) may obtain client storage data from the cloud storage gateways. The cloud storage gateway monitor (121) may obtain the client storage data by requesting the data storage history from the cloud storage gateways. The aforementioned client data storage history may be provided to the rule engine (122).

In one or more embodiments of the invention, the cloud storage gateway monitor (121) may obtain client data storage history from multiple cloud storage gateways and aggregate the obtained data to form a composite or aggregate client data storage history. In other embodiments of the invention, the client data storage histories of each cloud storage gateway may be stored separately.

In one or more embodiments of the invention, the cloud storage gateway monitor (121) may be implemented as a circuit. For example, cloud storage gateway monitor (121) may be implemented as a field programmable gate array, application integrated circuit, digital signal processor, or analog circuit. The cloud storage gateway monitor (121) may be implemented as other types of circuit without departing from the invention.

In one or more embodiments of the invention, the cloud storage gateway monitor (121) may be implemented as computer readable instructions stored on a non-transitory computer readable storage medium being executed by a processor. The computer readable instructions may cause the processor to perform the aforementioned functions of the cloud storage gateway monitor (121).

The rule engine (122) may match the client data storage histories obtained by the cloud storage gateway monitor (121) to one or more rules (124). The rules may specify operational characteristics of the cloud storage gateway(s) (130, FIG. 1A) when the client data storage histories meet a trigger requirement of the rule. When matched to a rule, i.e., meeting a trigger requirement of a rule, the matched rule may be provided to the cloud storage gateway manager (123).

In one or more embodiments of the invention, the rules (124) may be a data structure that specifies: (i) a trigger condition and (ii) one or more operational characteristics. In other words, the rules may specify the behavior of a cloud storage gateway based on the client data storage history associated with a client. In one or more embodiments of the invention, the client data storage history of multiple clients may be aggregated and the rules may trigger based on the aggregated histories.

In one or more embodiments of the invention, the trigger condition is a change in the rate of data storage in the data management device by a client during a predetermined period of time when compared to the rate of data storage in the data management device by the client during a prior predetermined period of time. In one or more embodiments of the invention, the trigger condition is the amount of change, e.g., a ratio, a percentage, a fixed quantity, etc., of the rate of data storage in the data management device by the client in a first time period when compared to the rate of data storage in the data management device by the client in a second time period.

In one or more embodiments of the invention, different magnitudes of changes in data storage rates may be associated with different rules. For example, a 5% increase in a data storage rate by a client may be associated with a first rules, a 20% increase may be associated with a second rule, etc. The changes may be a decrease in the data storage rates without departing from the invention.

In one or more embodiments of the invention, rule may specify one or more operational characteristics that determine a manner in which a cloud storage gateway functions. The operational characteristics may be: (i) an amount of a buffer of the cloud storage gateway assigned to the client, (ii) synchronous or asynchronous storage of data in the buffer and a cloud storage, (iii) purging of the buffer, (iv) sending of an alert, (v) storing data to a data storage of the cloud storage gateway via file shares or block shares, and/or (vi) implementing thin provisioning of the client data.

In one or more embodiments of the invention, the rule engine (122) may be implemented as a circuit. For example, rule engine (122) may be implemented as a field programmable gate array, application integrated circuit, digital signal processor, or analog circuit. The rule engine (122) may be implemented as other types of circuit without departing from the invention.

In one or more embodiments of the invention, the rule engine (122) may be implemented as computer readable instructions stored on a non-transitory computer readable storage medium being executed by a processor. The computer readable instructions may cause the processor to perform the aforementioned functions of the rule engine (122).

Utilizing the rules matched by the rule engine (122), the cloud storage gateway manager (123) generates modification messages based on the operational characteristics specified by the matched rules. After the generation, the modification messages are sent to the cloud storage gateways. The modification messages may be based on the operational characteristics specified by the one or more matched rules and may include one or more modification of the operational characteristics of the cloud storage gateways.

In one or more embodiments of the invention, the cloud storage gateway manager (123) may be implemented as a circuit. For example, cloud storage gateway manager (123) may be implemented as a field programmable gate array, application integrated circuit, digital signal processor, or analog circuit. The cloud storage gateway manager (123) may be implemented as other types of circuits without departing from the invention.

In one or more embodiments of the invention, the cloud storage gateway manager (123) may be implemented as computer readable instructions stored on a non-transitory computer readable storage medium being executed by a processor. The computer readable instructions may cause the processor to perform the aforementioned functions of the cloud storage gateway manager (123).

FIG. 1C shows a diagram of an example cloud storage gateway (130) in accordance with one or more embodiments of the invention. As discussed above, the cloud storage gateway (130) may receive client data storage/access requests from the storage node (120, FIG. 1) and store or provide the specified client data. To facilitate these functions, the cloud storage gateway (130) may include a storage manager (131) that manages where client data is stored and a persistent storage (132) for storing client data. Each component of the example storage node (120) is discussed below.

The storage manager (131) may select where and in what manner client data is stored. The client data may be stored in: (i) a buffer (132A), (ii) a data storage (132B), and/or (iii) a cloud storage (140, FIG. 1A). The storage manager (131) stores the client data to one or more of the aforementioned storages based on the last received modification message received from the cloud storage gateway manager (123) of the storage node (120). As previously discussed, each modification message includes operational characteristics that govern the operation of the cloud storage gateway (130). When a modification message is received, the manner in which the storage manager (131) stores data is modified in accordance with the modification message.

Additionally, the storage manager (131) may monitor the client data stored in the cloud storage gateway (130) over time on a per client basis. The storage manager (131) may provide the aforementioned client data storage history to a storage node (120, FIG. 1B) in response to requests for that information.

In one or more embodiments of the invention, the storage manager (131) may be implemented as a circuit. For example, storage manager (131) may be implemented as a field programmable gate array, application integrated circuit, digital signal processor, or analog circuit. The storage manager (131) may be implemented as other types of circuits without departing from the invention.

In one or more embodiments of the invention, the storage manager (131) may be implemented as computer readable instructions stored on a non-transitory computer readable storage medium being executed by a processor. The computer readable instructions may cause the processor to perform the aforementioned functions of the storage manager (131).

The persistent storage (132) may store client data. The persistent storage (132) may be a physical storage device. For example, the persistent storage (132) may be implemented as one or more hard disk drives, solid state drives, tape drives, or any other type of computer readable persistent storage medium. In one or more embodiments of the invention, the persistent storage (132) may be a logical storage that utilizes the storage capacity of multiple physical storage devices.

The persistent storage (132) may host a buffer (132A) that temporarily stores data received from the clients. The storage capacity of the buffer (132) may be allocated on a per client basis. In other words, portions of the storage capacity of the buffer (132) may be allocated to each client storing data in the data management device. The storage capacity of the buffer (132) may be allocated by the storage manager (132).

The persistent storage (132) may also host a data storage (132B). The data storage (132B) may store client data. In one or more embodiments of the invention, the data storage (132B) may be a network storage operably connected to the cloud storage gateway (130).

In one or more embodiments of the invention, the data storage (132B) may be accessed on a per file level, i.e., file shares, or on a per block level, i.e., block shares. File shares refer to accessing data stored in the data storage (132B) at a file level of granularity. Block shares refer to access data stored in the data storage (132B) at a block level of granularity. In one or more embodiments of the invention, file level sharing is performed using the common internet file system protocol. In one or more embodiments of the invention, block level sharing is performed using the internet small computer systems interface protocol. In one or more embodiments of the invention, the storage manager (131) sets whether file shares or block shares are used to access the data storage (132B).

Utilizing block shares, rather than file shares, may reduce the computing resources required to obtain the client data from the data storage (132B) when compared to obtaining the data using file shares at the cost of retrieving some data is not a part of the requested client data.

In one or more embodiments of the invention, the data storage (132B) may store data having a higher access priority than client data stored in the cloud storages. As used herein, a higher access priority refers to data that will likely be accessed more frequently than other data. The data having a higher access priority may be, for example, meta-data associated with the client data. In one or more embodiments of the invention, the meta-data may include a fingerprint of segments of the client data stored in the cloud storages. The data having a higher access priority maybe other types of data without departing from the invention.

FIG. 1D shows a diagram of an example cloud storage (140) in accordance with one or more embodiments of the invention. As discussed above, the cloud storage (140) may store client data. The cloud storage (140) may include a persistent storage (141) hosting a data storage (141A). The data storage (141A) may be a deduplicated storage, as discussed above.

Figure 2:
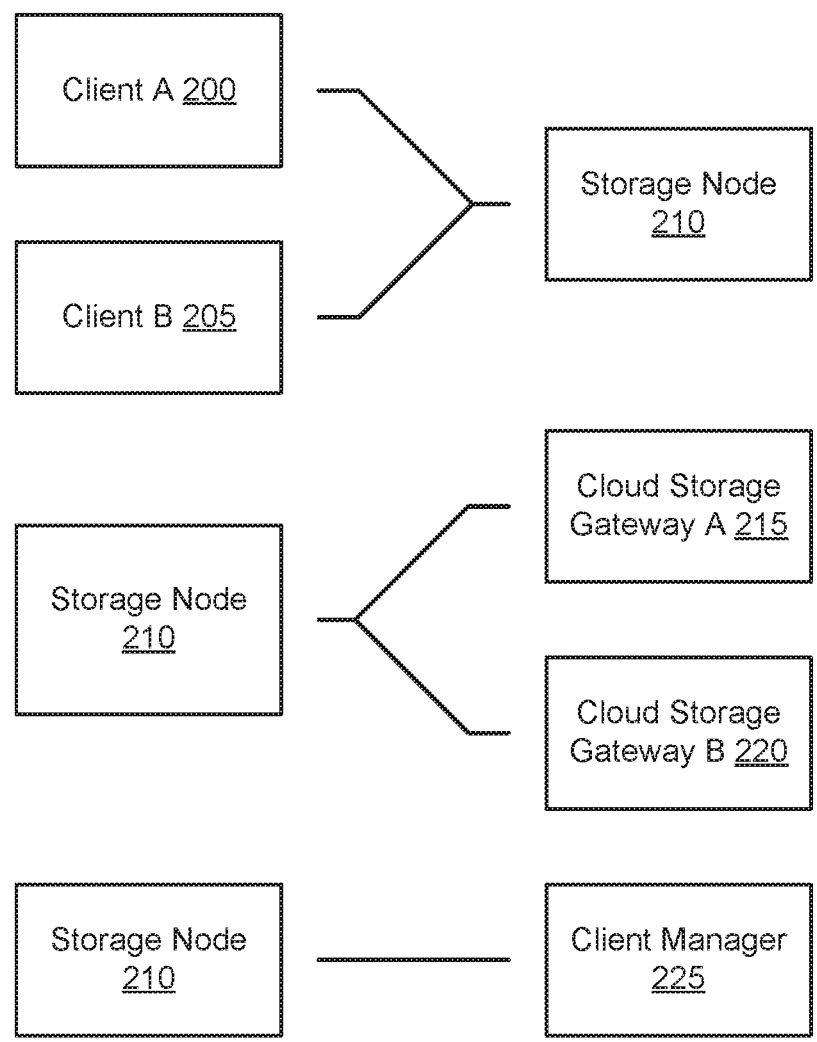
FIG. 2 shows a diagram of system relationships in accordance with one or more embodiments of the invention.

To further clarify relationships between components of the system illustrated in FIG. 1A, FIG. 2 shows a diagram of relationships between clients, storage nodes, cloud storage gateways, and client managers in accordance with one or more embodiments of the invention.

As seen from FIG. 2, there may be multiple clients (200, 205) for every storage node (210). In other words, a single storage node may receive client data access/storage requests from multiple clients. Similarly, there may be multiple cloud storage gateways (215, 220) for every storage node (210). In other words, a single storage node may be operably connected to multiple cloud storage gateways and/or direct client data to the multiple cloud storage gateways for storage. In contrast, there may be a one to one relationship between storage nodes (210) and client managers (225). In other words, each storage node may be associated with a corresponding client manager that manages the client interactions with the storage node.

As discussed above with respect to the cloud storages, client data may be deduplicated before it is stored to reduce the quantity of storage space required to store the client data. To further clarify this process, FIGS. 3A and 3B show data structures used as a part of the process of performing deduplication.

Figure 3A:
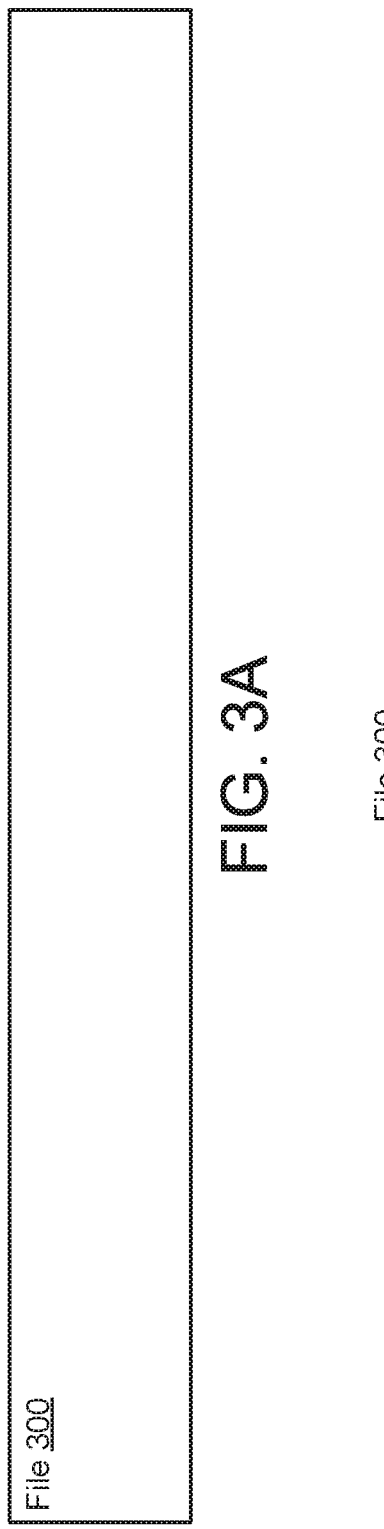
FIG. 3A shows a diagram of a file in accordance with one or more embodiments of the invention.

More specifically, FIG. 3A shows a diagram of a file (300) in accordance with one or more embodiments of the invention. The file (300) may include data. The data may be any type of data, may be in any format, and of any length. The file (300) may be a file sent to a data management device for storage from a client.

Figure 3B:
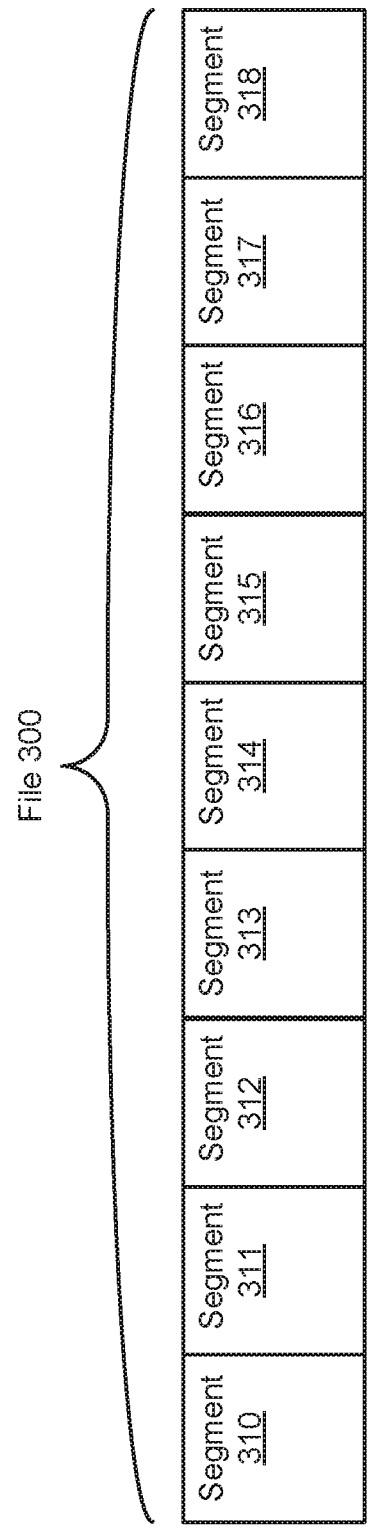
FIG. 3B shows a diagram of a relationship between segments of a file and the file in accordance with one or more embodiments of the invention.

FIG. 3B shows a diagram of segments (310-318) of the file (300) of the data. As discussed, files may be segmented to perform deduplication before storing the deduplicated segments of the files. Each segment may include separate, distinct portions of the file (300). Each of the segments may be of different, but similar lengths. For example, each segment may include approximately 8 kilobytes of data, e.g., a first segment may include 8.03 kilobytes of data, the second segment may include 7.96 kilobytes of data, etc. In one or more embodiments of the invention, the average amount of data of each segment is between 7.95 and 8.05 kilobytes.

As discussed above, the data management device (150, FIG. 1A) may store data from clients (100, FIG. 1A). When storing the data, the data management device (150, FIG. 1A) may deduplicate the data before storage. Deduplication may consume computing resources. In the following flow charts, methods for managing the behavior of the data management device (150, FIG. 1A) are shown that may ensure a quality of storage service to the clients.

Figure 4A:
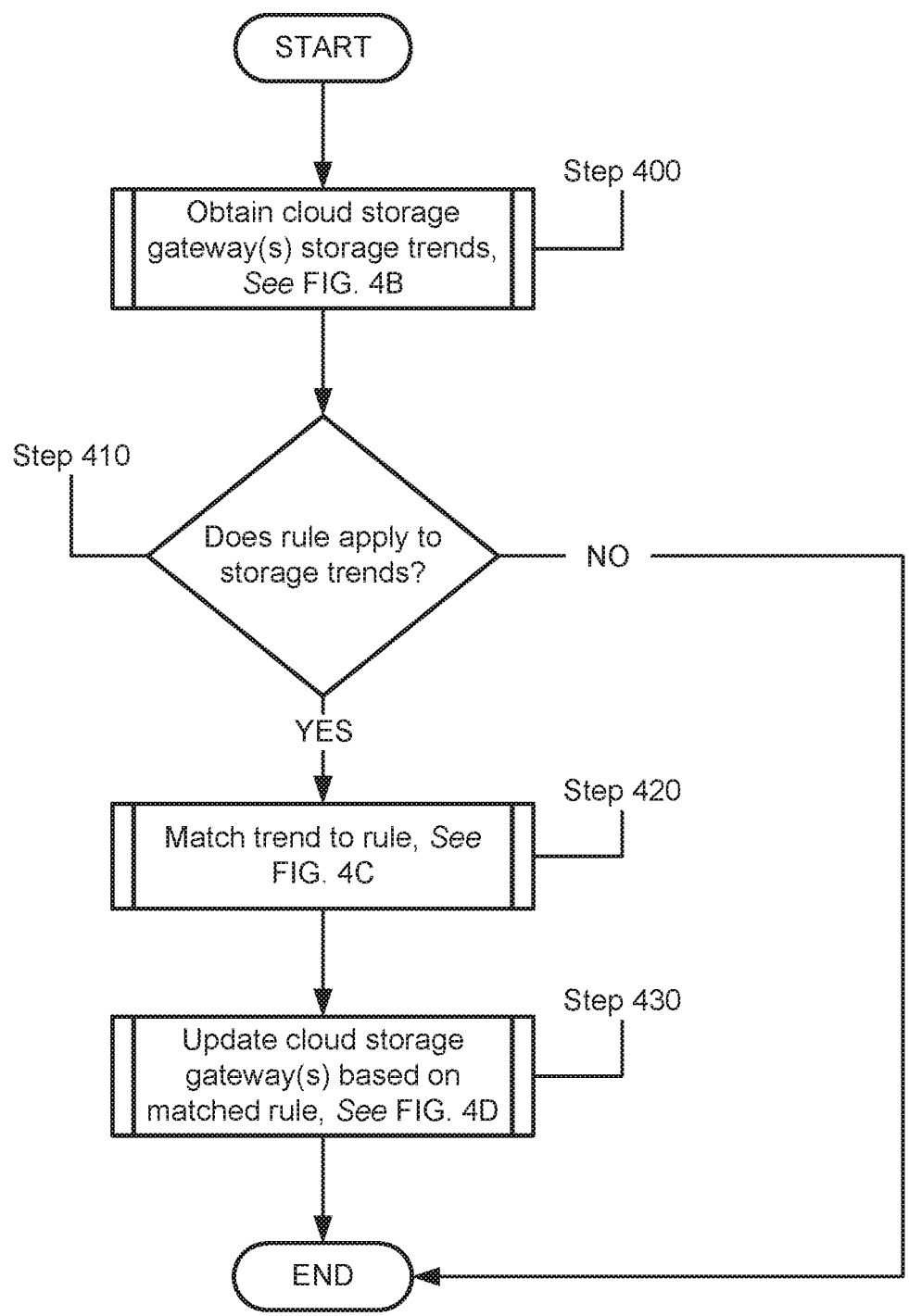
FIG. 4A shows a flowchart of a method of operating a data management device in accordance with one or more embodiments of the invention.

FIG. 4A shows a flowchart of a method in accordance with one or more embodiments of the invention. The method depicted in FIG. 4A may be used to update the operation of the data management device in accordance with one or more embodiments of the invention. The method shown in FIG. 4A may be performed by, for example, a storage node (120, FIG. 1A). Other component of the data management device (150, FIG. 1A) or the illustrated system may perform the method illustrated in FIG. 4A without departing from the invention.

In Step 400, storage trends are obtained from cloud storage gateways. The trends may be obtained by sending a request for the trends to the cloud storage gateways. The trends may specify the rate of storing client data over a predetermined period of time. In one or more embodiments of the invention, the predetermined period of time may be one hour.

In Step 410, it is determined when a rule applies to the storage trends. As discussed with respect to FIG. 1B, the rules may specify a trigger condition. The storage trends may be compared to the trigger conditions to determine whether a trend meets a trigger condition. If a rule applies, the method proceeds to Step 420. If a rule does not apply, the method may end following Step 410.

In Step 420, the storage trend is matched to a rule. The storage trend may be matched by comparing the storage trend to a storage trend during a previous predetermined period of time. For example, the storage trend obtained for a current period of time may be compared to a storage trend during a previous period of time to calculate a difference between the two periods. The difference may then be compared to trigger conditions of the rules to determine which rule(s) are invoked due to the change.

In one or more embodiments of the invention, the difference may be expressed as a percentage change from a previous time period. In one or more embodiments of the invention, the difference may indicate an increase or decrease in the storage rate of client data by the client. In one or more embodiments of the invention, each rule may have a trigger condition expressed in terms of the magnitude of the difference. For example, a first rule may have a trigger condition of a difference of between 0% and 10%, a second rule may have a trigger condition of a difference of between 10% and 25%, a third rule may have a trigger condition of a difference of between 25% and 50%, and a fourth rule may have a trigger condition of greater than 50%.

In Step 430, a cloud storage gateway is updated based on the matched rule(s). More specifically, the cloud storage gateway is updated based on the storage behaviors specified by the matched rule. In one or more embodiments of the invention, the cloud storage gateway is updated by generating a message that specifies the changes specified by the matched rules. The generated message is then sent to the cloud storage gateway. The cloud storage gateway applies the changes specified by message.

The method may end following Step 430.

Figure 4B:
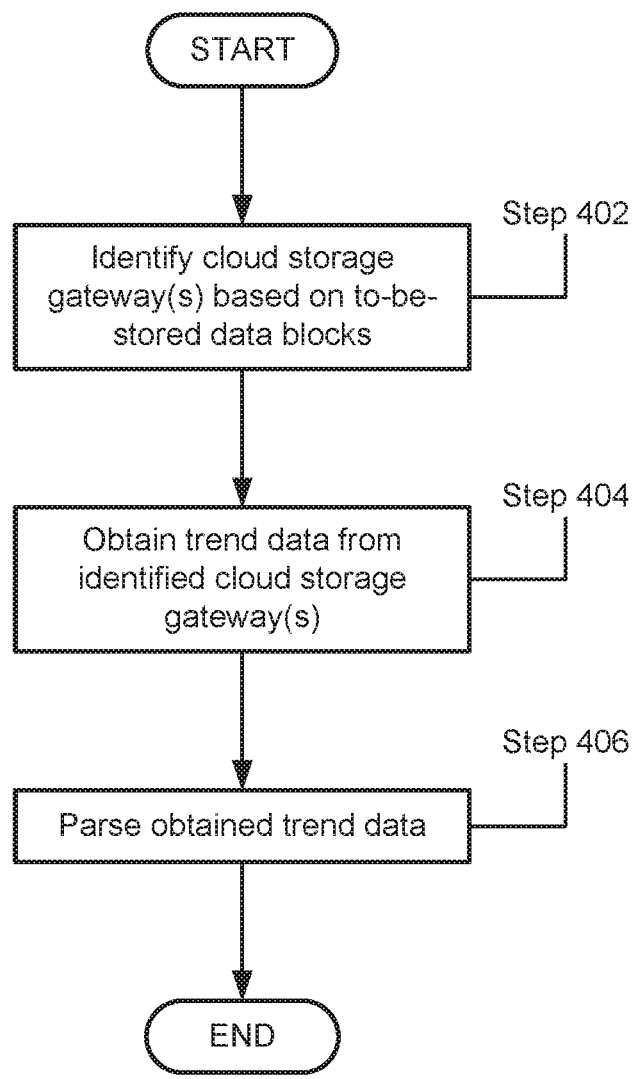
FIG. 4B shows a flowchart of a method of obtaining storage trends in accordance with one or more embodiments of the invention.

FIG. 4B shows a flowchart of a method in accordance with one or more embodiments of the invention. The method depicted in FIG. 4B may be used to obtain storage trends in accordance with one or more embodiments of the invention. The method shown in FIG. 4B may be performed by, for example, a storage node (120, FIG. 1A). Other component of the data management device (150, FIG. 1A) or the illustrated system may perform the method illustrated in FIG. 4B without departing from the invention.

In Step 402, cloud storage gateway(s) are identified based on to-be-stored data. The gateways may be identified by identifying the client that sent the to-be-stored data and matching the client to cloud storage gateway(s) in which data from the identified client is stored.

In Step 404, storage trend data is obtained from the cloud storage gateway(s) identified in Step 402. The storage trend data may be obtained by requesting the data from the identified cloud storage gateway(s). The cloud storage gateway(s) may provide the requested data in response to the requests. The request may specify the client and a time period. The response may include the storage trend data for the client the time period.

In Step 406, the obtained storage trend data is parsed to obtain trend data. The trend data may be an aggregation of storage trend data obtained from multiple cloud storage gateway(s). For example, client data may be stored in multiple, separate cloud storage gateways. Aggregating the cloud storage data may provide a storage trend for the client for the entire data management device. The storage trend data may be aggregated by adding the storage rates during corresponding period of time in each of storage trend data for each cloud gateway storage together resulting in the rate of client data is stored in the data management device regardless of which storage the client data is stored.

The method may end following Step 406.

Figure 4C:
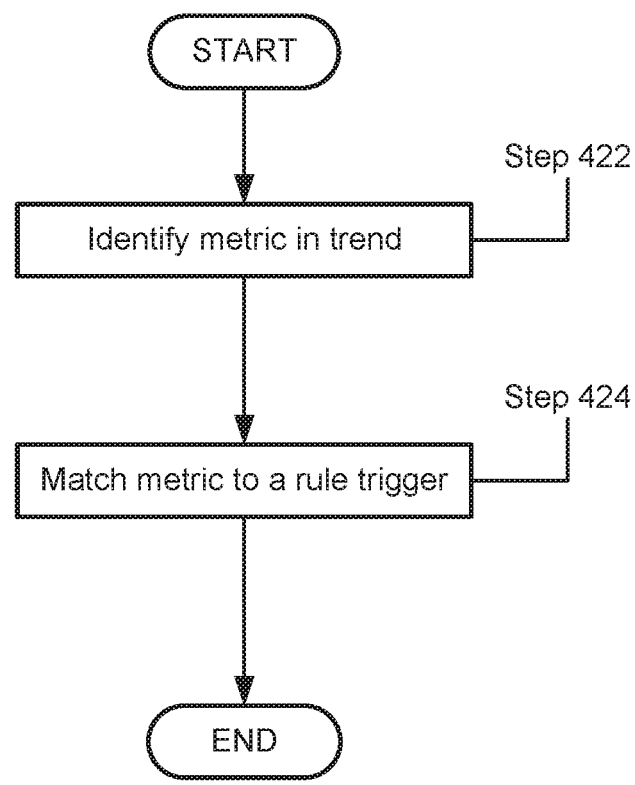
FIG. 4C shows a flowchart of a method of performing rule matching in accordance with one or more embodiments of the invention.

FIG. 4C shows a flowchart of a method in accordance with one or more embodiments of the invention. The method depicted in FIG. 4C may be used to match trends to rules in accordance with one or more embodiments of the invention. The method shown in FIG. 4C may be performed by, for example, a storage node (120, FIG. 1A). Other component of the data management device (150, FIG. 1A) or the illustrated system may perform the method illustrated in FIG. 4C without departing from the invention.

In Step 422, a metric is identified in a storage trend. As used herein, a metric of a storage trend is a characteristic of the storage trend that is identifiable. In one or more embodiments of the invention, the metric may be a change in the rate of storing data by a client during a predetermined period of time when compared to a rate of storing data in the data management device in a prior time period. In one or more embodiments of the invention, the predetermined period of time may be less than one hour. In one or more embodiments of the invention, the predetermined period of time may be more than fifteen minutes.

In one or more embodiments of the invention, the metric may be inclusion of a predetermined quantity of a type of data in the stored data. For example, the predetermined type of data may be data that is not duplicate of data already stored in the data storage device. In another example, the predetermined type of data may be data this is duplicate of stored data. The predetermined quantity may be, for example, 50% of the data stored by a client during a predetermined period of time.

In Step 424, the metric is matched to a trigger of a rule. The metric may be matched to multiple rules without departing from the invention.

The method may end following Step 424.

Figure 4D:
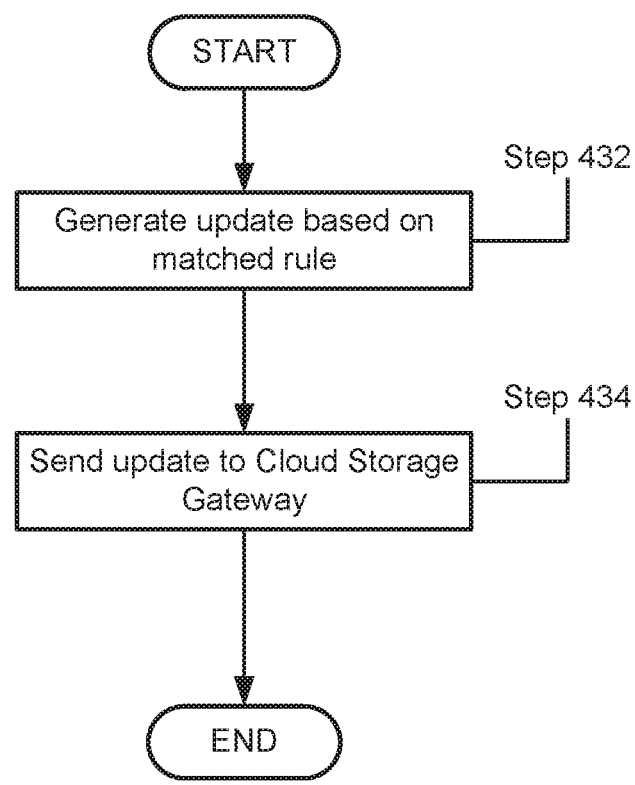
FIG. 4D shows a flowchart of a method of updating a cloud storage gateway in accordance with one or more embodiments of the invention.

FIG. 4D shows a flowchart of a method in accordance with one or more embodiments of the invention. The method depicted in FIG. 4D may be used to send an update to a cloud storage gateway in accordance with one or more embodiments of the invention. The method shown in FIG. 4D may be performed by, for example, a storage node (120, FIG. 1A). Other component of the data management device (150, FIG. 1A) or the illustrated system may perform the method illustrated in FIG. 4D without departing from the invention.

In Step 432, an update is generated based on a matched rule. As discussed with respect to FIG. 4C, one or more rules may be matched. Each of the matched rules may specify one or more modifications of the operation of a cloud storage gateway. A message specifying the one or more modifications of the operation of the cloud storage gateway may be generated by aggregating the modifications into a message. Alternatively, multiple separately messages each including a single modification may be generated.

In Step 434, one or more messages generated in Step 432 are sent to an associated cloud storage gateway. Sending the messages may cause the cloud storage gateway to modify its behavior based on the messages.

The method may end following Step 434.

Figure 5A:
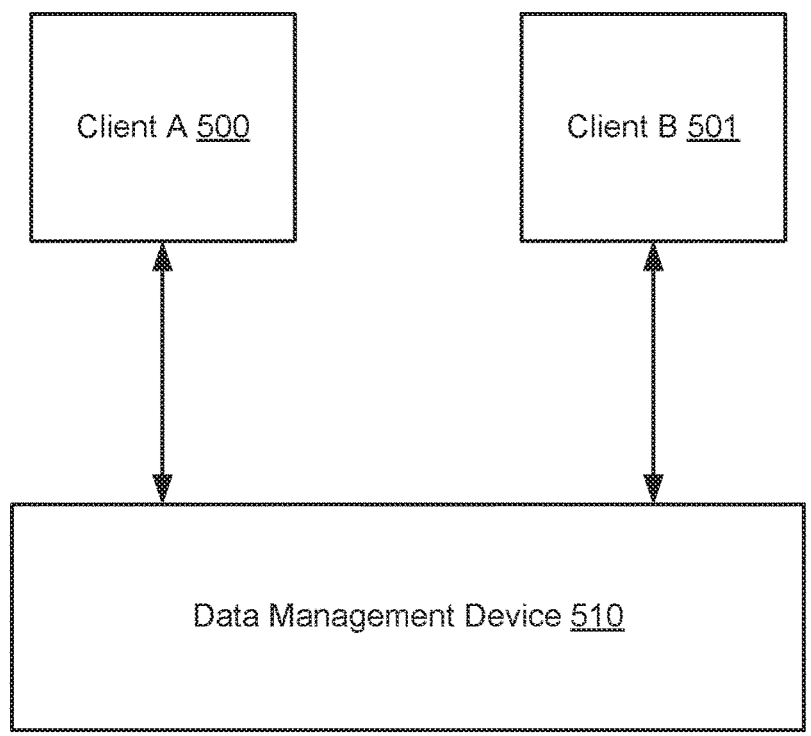
FIG. 5A shows a diagram of an example system.
Figure 5B:
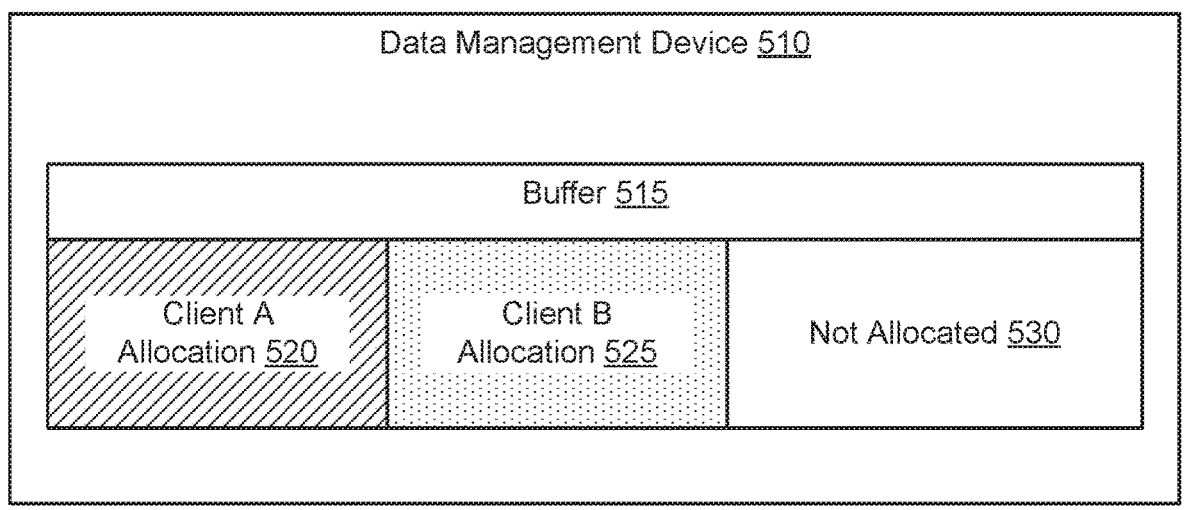
FIG. 5B shows a diagram of an example buffer of a data management device at a first time.
Figure 5C:
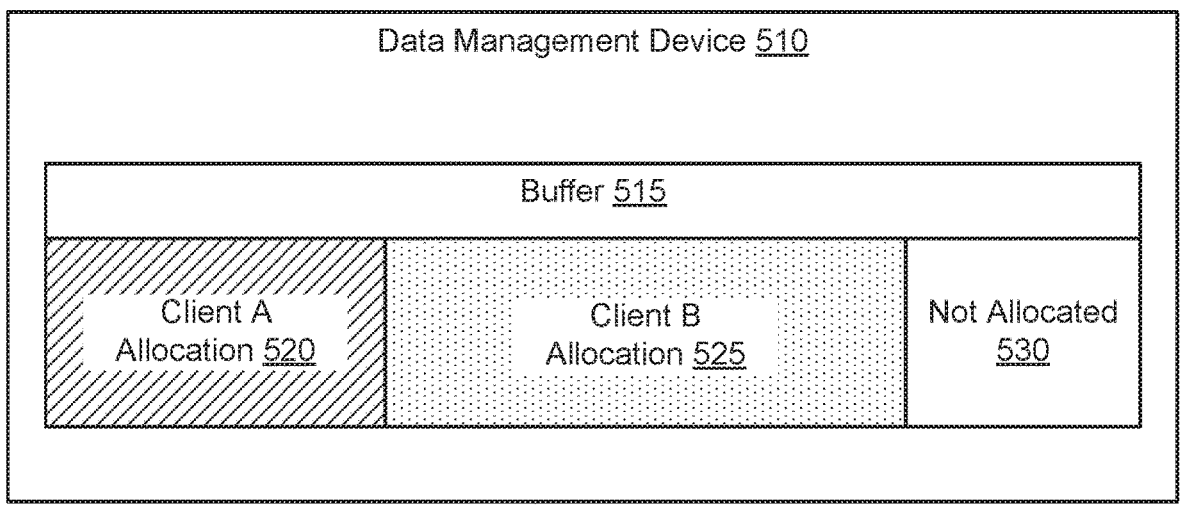
FIG. 5C shows a diagram of an example buffer of a data management device at a second time.

To further explain embodiments of the invention, a non-limiting example is shown in FIGS. 5A-5C.

Example 1

FIG. 5A shows an example system. The system includes a data management device (510) operably connection to client A (500) and client B (501). The data management device (510) may include buffer (515) for storing data sent from the clients to the data management device (510) for storage.

At a first point in time, a first portion of the buffer (520) may be allocated to client A (500) and a second portion of the buffer may be allocated to client B (501). A remaining portion of the buffer may not be allocated (530).

Following the first point in time, Client B (501) may need to backup a disk drive. To do so, it may send the data, or a portion thereof, on the disk drive to the data management device (510) for backup. The data management device (510) may store the data.

At a second point in time, the data management device (510) may analyze the storage trend of client B (525) during the period of time between the first point in time and the second point in time and compare it to the storage trend of client B (525) prior to the first point in time. For example, the data management device (510) may identify that client B (525) is storing a large amount of data during the second time period when compared to the previous time period. Based on this comparison, the data management device (510) identifies that the storage trend meets a rule that specifies that a larger portion of the buffer is to be allocated to client B (501).

In response to the determination, the data management device (510) allocates a larger portion of the buffer to client B as illustrated in FIG. 5C. For example, in FIG. 5C the graphical representation of the client B Allocation (525) is larger than the allocation in FIG. 5B and the not allocated (530) portion of the buffer has reduced in size. Thus, when data is received from client B (501), the data management device (510) may store additional client B data in the buffer (515). Increasing the buffer allocation to client B (501) helps to ensure a quality of storage service to client B (501) by dedicating additional computing resources of the data management device (510) to client B.

Example 1 ends here.

One or more embodiments of the invention may be implemented using instructions executed by one or more processors of the data management device. Further, such instructions may correspond to computer readable instructions that are stored on one or more non-transitory computer readable mediums.

One or more embodiments of the invention may enable one or more of the following: i) improve a quality of storage service offered by a data management device to a client by improve allocation off computing resources on a per client basis, ii) enable lower tiers of storage such as cloud storage to be used while ensuring a quality of storage service by dynamically changing the storage behavior of a data management device, iii) provide an unconventional arrangement of storage nodes and devices that enable the nodes to identify trends on a per storage device and system level so the storage trends on a per client, rather than per device, basis are able to be obtained, iv) provide a method of dynamically modifying the operation of the data management device in response to changing client data storage demands, and v) provide a method of dynamically modifying the storage behavior of a data management device based on the future potential storage rate requirements of a client proactively to prevent quality of storage service reductions.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A data management device, comprising:
  a persistent storage; and
  a processor programmed to:
    obtain a data storage trend from a cloud storage gateway that specifies a rate of storing client data in a persistent storage over a predetermined period of time, wherein the client data is initially received from a client and stored in a storage node of the data management device prior to being stored in the persistent storage, wherein the persistent storage is located on the cloud storage gateway, wherein the storage node is interposed between the client and the cloud storage gateway;
    match a persistent storage trend to a rule based on the data storage trend, wherein the rule is stored in the storage node; and
    meet a quality of storage service required for the client data by applying the matched rule to a manager of the persistent storage, wherein the manager receives a message containing the matched rule and wherein the manager is located on the storage node,
    wherein the matched rule specifies a modification to an amount of computing resources allocated for storing the client data,
    wherein the quality of storage service required for the client data specifies a maximum amount of time before the client data must be available to be retrieved from the persistent storage.

2. The data management device of claim 1, wherein the processor is further programmed to:
  obtain a set of rules comprising the matched rule, wherein each rule of the set of rules comprises a trigger condition and a modification to a transfer characteristic associated with the persistent storage.

3. The data management device of claim 2, wherein the trigger condition of a rule of the set of rules specifies a predetermined increase in the rate of storing the client data over the predetermined period of time when compared to a prior rate of storing the client data over a prior predetermined period of time.

4. The data management device of claim 3, wherein the predetermined period of time comprises less than one hour.

5. The data management device of claim 4, wherein the predetermined period of time comprises more than fifteen minutes.

6. The data management device of claim 2, wherein the trigger condition of a rule of the set of rules specifies a predetermined decrease in the rate of storing the client data over the predetermined period of time when compared to a prior rate of storing the client data over a prior predetermined period of time.

7. The data management device of claim 1, further comprising:
  a buffer that obtains the client data before the client data is stored in the persistent storage.

8. The data management device of claim 7, wherein the matched rule specifies an increase in a quantity of the buffer allocated for the client data.

9. The data management device of claim 7, wherein the matched rule specifies a purge of the buffer.

10. The data management device of claim 7, wherein the matched rule specifies a decrease in a quantity of the buffer allocated for the client data.

11. The data management device of claim 1, further comprising:
  a data storage, shared with a second data management device, that stores additional client data,
  wherein the data storage is a higher performance storage than the persistent storage.

12. The data management device of claim 11, wherein the matched rule specifies that the data management device accesses the data storage using file level sharing.

13. The data management device of claim 12, wherein the file level sharing is performed using a common internet file system protocol.

14. The data management device of claim 11, wherein the matched rule specifies that the data management device accesses the data storage using block level sharing.

15. The data management device of claim 14, wherein the block level sharing is performed using an internet small computer systems interface.

16. The data management device of claim 1, wherein the processor is further programmed to:
obtain a set of rules comprising the matched rule, wherein the set of rules specify modifications of transfer characteristics associated with the persistent storage as a function of a relative change in the rate of storing the client data in the persistent storage from a prior predetermined period of time.

17. The data management device of claim 1, further comprising:
a buffer that obtains the client data before the client data is stored in the persistent storage; and
a data storage, shared with a second data management device, that stores high priority client data having an access priority that is greater than an access priority of the client data stored in the persistent storage.

18. A method of operating a data management device, comprising:
obtaining, by the data management device, a data storage trend from a cloud storage gateway that specifies a rate of storing client data in a persistent storage over a predetermined period of time, wherein the client data is initially received from a client and stored in a storage node of the data management device prior to being stored in the persistent storage, wherein the persistent storage is located on the cloud storage gateway, wherein the storage node is interposed between the client and the cloud storage gateway;
matching, by the data management device, a persistent storage trend to a rule based on the data storage trend, wherein the rule is stored in the storage node; and
meeting a quality of storage service required for the client data by applying, by the data management device, the matched rule to a manager of the persistent storage that manages the persistent storage, wherein the manager receives a message containing the matched rule and wherein the manager is located on the storage node,
wherein the matched rule specifies a modification to an amount of computing resources allocated for storing the client data,
wherein the quality of storage service required for the client data specifies a maximum amount of time before the client data must be available to be retrieved from the persistent storage.

19. A non-transitory computer readable medium comprising computer readable program code, which when executed by a computer processor enables the computer processor to perform a method for operating a data management device, the method comprising:
obtaining, by the data management device, a data storage trend from a cloud storage gateway that specifies a rate of storing client data in a persistent storage over a predetermined period of time, wherein the client data is initially received from a client and stored in a storage node of the data management device prior to being stored in the persistent storage, wherein the persistent storage is located on the cloud storage gateway, wherein the storage node is interposed between the client and the cloud storage gateway;
matching, by the data management device, a persistent storage trend to a rule based on the data storage trend, wherein the rule is stored in the storage node; and
meeting a quality of storage service required for the client data by applying, by the data management device, the matched rule to a manager of the persistent storage that manages the persistent storage, wherein the manager receives a message containing the matched rule and wherein the manager is located on the storage node,
wherein the matched rule specifies a modification to an amount of computing resources allocated for storing the client data,
wherein the quality of storage service required for the client data specifies a maximum amount of time before the client data must be available to be retrieved from the persistent storage.

\* \* \* \* \*